United States Patent [19]
Calogero

[11] Patent Number: 6,126,701
[45] Date of Patent: Oct. 3, 2000

[54] METHOD OF DYEING POLYOLEFIN FIBERS

[76] Inventor: Frank Calogero, 592 McCreery Rd., Jefferson, Ga. 30549

[21] Appl. No.: 09/327,646

[22] Filed: Jun. 8, 1999

[51] Int. Cl.[7] ............... D06P 3/79; D06P 1/20; D06P 1/90
[52] U.S. Cl. ............ 8/616; 8/513; 8/675; 8/928
[58] Field of Search ............... 8/928, 513, 675, 8/616

[56] References Cited

U.S. PATENT DOCUMENTS

| | | |
|---|---|---|
| 3,046,076 | 7/1962 | Upshur . |
| 3,092,435 | 6/1963 | Tessandori et al. . |
| 3,128,146 | 4/1964 | Bianco et al. . |
| 4,369,039 | 1/1983 | Coates . |

OTHER PUBLICATIONS

Erlich, V., The Development of Commercial Propylene Fiber, Modern Textiles Magazine, Feb. 1965, pp. 36,38,42, 76–78.

Farber, Milton, Latest Developments in Polypropylene, American Dyestuff Reporter, Jul. 4, 1966, pp. 26–31.

Hartley, P.N.,, Coloration of Polypropylene, International Dyer and Printer (Rayon and Synthetic Fibres Supplement), Oct. 1, 1965, pp. 541–543.

Eddington, E.M., A Status Report on Dyeing of Polypropylene, American Dyestuff Reporter, Jan. 21, 1963, pp. 31–34 (P47–P50).

Curtis, R.G., Dyeable Polypropylene, American Dyestuff Reporter, May 11, 1964, pp. 44–50 (P380–P386).

Giles, C.H., The Coloration of Synthetic Polymers, J. British Polymers, vol. 3, (1971), pp. 279–289.

Lord, W.M. and Peters, A.J., Alkylaminoanthraquinones as Dyes for Polypropylene Fibres, J. of Applied Chemical Biotechnology, vol. 27, (1977), pp. 362–368.

Fordemwalt, F., The Dyeing of Polypropylene For Textiles, American Cyestuff Reporter, Feb. 15, 1965, pp. 34–46 (P10–P119).

Bird, C.L. and Patel, A.M., The Dyeing of Unmodified Polypropylene with Disperse Dyes, JSDC, Nov. 1968, pp. 560–563.

*Primary Examiner*—Margaret Einsmann
*Attorney, Agent, or Firm*—Kennedy, Davis & Hodge, LLP

[57] ABSTRACT

Polyolefin fibers are dyed with an emulsion that is prepared by mixing water with a long chain anthraquinone dye dissolved in an organic solvent.

2 Claims, No Drawings

METHOD OF DYEING POLYOLEFIN FIBERS

TECHNICAL FIELD

This invention relates generally to methods of dyeing polyolefin fibers, and particularly to methods of dyeing unmodified polypropylene and polyethylene fibrous materials with an aqueous dye bath that yields uniform coloration.

BACKGROUND OF THE INVENTION

Polyolefins such as polypropylene and polyethylene are paraffinic hydrocarbons. As such they have no polar groups in their polymer chains. This is advantageous where they are made into fibrous materials such as carpets for their cleanability and stain resistant properties. Their resistance to most acids, alkalis and bleaches however also renders them difficult to dye. They are soluble only in hot chlorinated and aromatic hydrocarbons.

As opposed to polyolefins, most fibers, including polyesters, are dyeable in aqueous mediums. Cotton, wool and nylon fibers, for example, are swollen by water which renders them susceptible to penetration by dye molecules. Under ideal conditions, with a proper match of fiber and dye, most all of the dye in a dye bath is absorbed by the fibers. Once removed from the bath, scoured, rinsed and dried, the dye is held by ionic bonds, covalent bonds, hydrogen bonds and sometimes by physical entrapment. Polyolefins on the other hand, because of their hydrocarbon composition, are not swollen by water. Thus little penetration occurs when they are dyed in an aqueous dye bath, the dye instead being deposited on or near the fiber surface. Not being chemically bonded to the fiber, the dye is rapidly removed by abrasion during normal material use and cleaning.

For these reasons polyolefins have had to be dyed in unconventional manners, primarily by modifying the polymer before dyeing. To this end, metals in the form of inorganic and organometallic compounds have been used for points of attachments for the dyes. A great variety of low molecular weight materials, including salts, alcohols, acids and amines have been added. Although it may seem easy in principle merely to add a dye receptor, this approach has many problems and limitations. For example, the additive must be stable at temperatures up to 600° F. but yet usable. The additive must have at least some compatibility with the polyolefin. It must also be capable of a relatively fine state of dispersion within the fiber. Without dye site uniformity, the fiber itself will not dye uniformly.

In addition, most metal compounds added to polyolefins are dull in shade. Level dyeing has also been very difficult to achieve since once the dye-metal complex is formed, no migration takes place. Thus any slight irregularity of the fiber shows up badly.

Dye sites have also been added to polypropylene by copolymerization with dye site monomers. However this is impractical because of interference by the comonomers in the stereospecific mechanism leading to the formation of the isotactic structure. Most all types of monomers have been used, ranging from chloromethylstyrene to vinylpyridine to vinyl esters. Grafting techniques employing acrylic acids or esters, styrene or alkylstyrenes, vinyl acetate, unsaturated organosilanes, and various halogenated derivatives of these monomers have been tried, but manufacturing cost and thermal instability have hindered their commercialization. Although grafting has the advantage of producing permanent attachment of the dye receptor, it too is both expensive and cumbersome.

A less drastic method of modifying the polyolefin has been to include the additive in the polymer melt before extrusion. The best compatibility with the polymer meld is given by non-polar additives of low molecular weight at relatively high extrusion temperatures. Additives of higher polarity, however, are more effective. Dyeability with disperse dyes has been improved using maleic anhydride, phenols and arylsufonamides.

Partial degradation reactions have also been used to make polypropylene more dyeable. Disadvantages with this approach include deterioration in physical properties, the corrosive nature of many reagents used, and the difficulty of controlling uniformity of the treatment which is essentially a surface treatment. Many different chemical reactions on the polypropylene chain have been attempted. These reactions are based upon the known reaction of aliphatic hydrocarbons with phosphorus trichloride. In the presence of oxygen, the tertiary hydrogen is replaced by a chlorophosphate group. Hydrolysis with water yields a basic-dyeable phosphoric acid. Treatment with an amine or polyamine produces an acid-dyeable phosphonamide site. Other reagents used include sulfuric, nitric, chromic, and chlorosulfonic acids, organophosphorus compounds and silicone halides. As with grafting, the type of modification is usually cumbersome and expensive and thus of little commercial value.

SUMMARY OF THE INVENTION

A method of dyeing polyolefins fibers has now been discovered that does not require modification of the polymer prior to dyeing. The fibers are contacted with a colloidal emulsion that is at or above the glass transition temperature ($T_G$) of the polyolefin. The emulsion is prepared by mixing water with a long chain alkyl substituted anthraquinone dye dissolved in an organic solvent. The dye has been found not only to penetrate the fibers for durability but to do so uniformly to yield strikingly uniformity of material coloration. It is believed that by dissolving the dye in the organic solvent first provides for small dye particulates to cover the fiber surface followed by diffusion of the dye and its bonding into the interior of the fiber by, in effect, a co-crystallization of the alkylamino functionality of the dye with the alkyl chains to the polyolefin.

The anthraquinone must have between 8 and 18 carbons in its chain for polypropylene with 18 having been found to be ideal. For polyethylene the chain should be 8 to 10 carbons. Though as few as 5 carbons are workable for both of these polyolefins, more than 8 are highly preferred. Five or more are considered to constitute long chains for the purpose of this application. The dye bath should be elevated to at least 90° C.

DETAILED DESCRIPTION

Synthesis of the Anthraquinone Dyes

Group I

1-, and 1,4 -amino anthraquinone dyes were prepared by the condensation of 1-hydroxy-, 1-halogeno-, 1,4-dihalogeno-anthraquinone, quinizarin and leucoquinizarin and long chain linear and branched alkyl amines (carbon chain length of 5–18). The mono-substituted amino anthraquinones are violet/red in color. The di-substituted or diamino anthraquinones are blue.

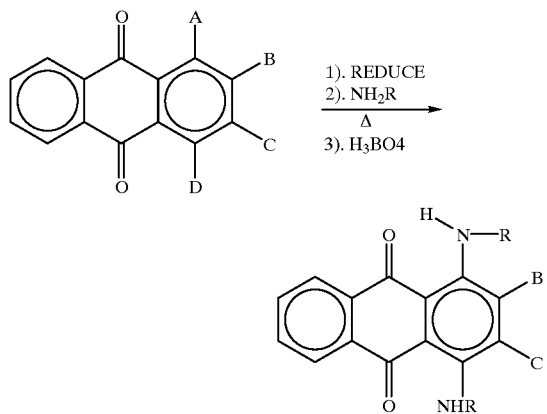

A=—OH, —HALOGEN
B=—H, —OH, —NH$_2$, —HALOGEN, —NO$_2$, —SO$_3^-$M$^+$, NHR
C=H, OH, —NH$_2$, —HALOGEN, —NO$_2$, SO$_3^-$M$^+$, NHR
D=H, —OH, NH$_2$, —HALOGEN, —SO$_3^-$M$^+$, —NO$_2$, —NHR
R=—(C$_4$H$_9$–C$_{18}$H$_{37}$)
M$^+$=Na$^+$, K$^+$, NH$_4^+$

Group II 1,5-diamino anthraquinone dyes were prepared by the condensation of 1,5-dihyroxy anthraquinone or 1,5-dihalogeno anthraquinone and long chain linear or branched alkyl amines (carbon chain length of 5–18). The 1,5-diamino anthraquinones are yellow to orange.

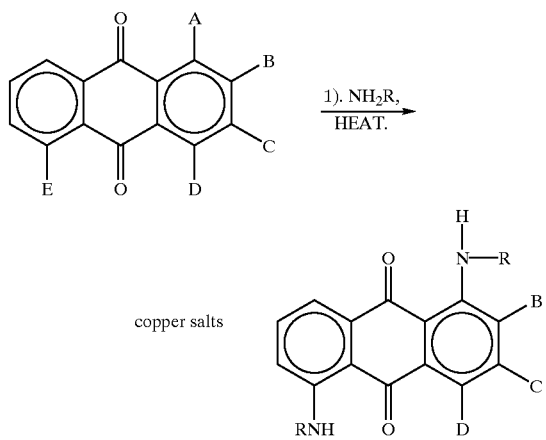

A=—OH, HALOGEN
B=H, —OH, —NH$_2$, —NHR, —HALOGEN, —NO$_2$, —SO$_3^-$M$^+$
C=H, —OH, —NH$_2$, —NHR, —HALOGEN, —NO$_2$, —SO$_3^-$M$^+$
D=H, —OH, —NH$_2$, —NHR, —HALOGEN, —NO$_2$, —SO$_3^-$M$^+$
E=—OH, HALOGEN
R=—(C$_4$H$_9$–C$_{18}$H$_{37}$)
M$^+$=Na$^+$, K$^+$, NH$_4^+$

Group III 1,8-diamino anthraquinone dyes were prepared by the condensation of 1,8-dihyroxy anthraquinone, 1,8-dihalogeno anthraquinone and a mixture of the 1,8-hydroxy and halogen substituted anthraquinone and long chain linear or branched alkyl amines (carbon chain length of 5–18). The 1,8-diamino anthraquinones are red to orange.

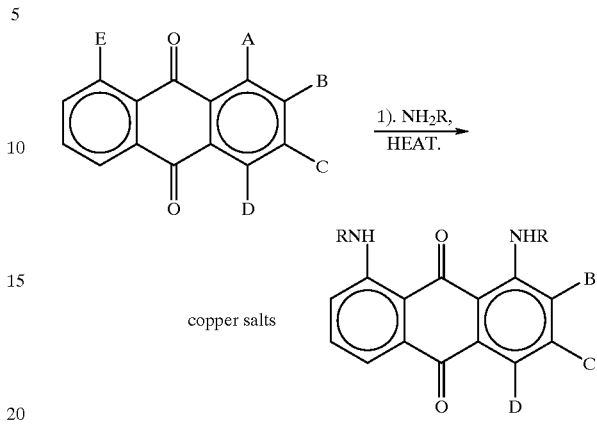

A=—OH, —HALOGEN
B=H, —OH, —NH$_2$, —NHR, —HALOGEN, —NO$_2$, —SO$_3^-$M$^+$
C=H, —OH, —NH$_2$, —NHR, —HALOGEN, —NO$_2$, —SO$_3^-$M$^+$
D=H, —OH, —NH$_2$, —NHR, —HALOGEN, —NO$_2$, —SO$_3^-$M$^+$
E=—OH, —HALOGEN
R=—(C$_4$H$_9$–C$_{18}$H$_{37}$)
M$^+$=Na$^+$, K$^+$, NH$_4^+$

Group IV

Beta-long chain alkyl amino substituted anthraquinone dyes were generated by the condensation of at least a beta-halogen, -hydroxyl, or -sulfonate substituted anthraquinone (preferably a 1,4- substituted anthraquinone with unreactive moieties at these sites) and long chain linear or branched alkyl amines (carbon chain length of 5–18). The beta-amino anthraquinones have the same color as the original anthraquinone material, since the beta positioned substituents do not contribute to the color of the dye.

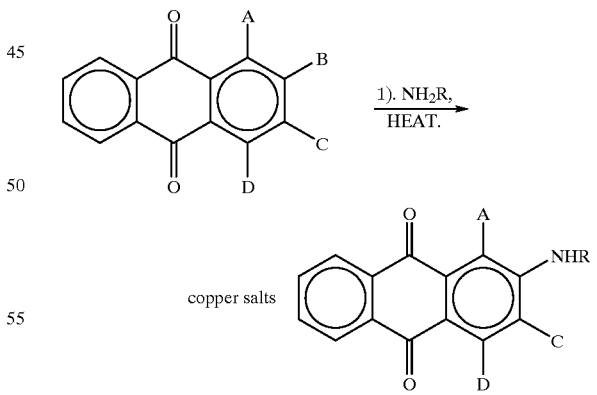

A=—H, —OH, —HALOGEN, —NO$_2$, —SO$_3^-$M$^+$, NH$_2$, NHR
B=—H, —OH, —HALOGEN, —NO$_2$, —SO$_3^-$M$^+$, NH$_2$, NHR
C=—H, —OH, —HALOGEN, —NO$_2$, —SO$_3^-$M$^+$, NH$_2$, NHR
D=—H, —OH, —HALOGEN, —NO$_2$, —SO$_3^-$M$^+$, NH$_2$, NHR $M = Na^+, K^+, NH^+_4$ $R = (C_4H_9 - C_{18}H_{37})$

The dyes were mixed in organic solvents and emulsifiers. The preferred were aromatic and aliphatic hydrocarbons, esters, fatty and other organic acids, triglycerides, amides, imides, amines, alcohols, nonionic polymers, anionic and cationic polymers and the ethoxylated derivatives of these. The dye was from 0.01% to 25.00% of the weight of the fiber and the solvent was from 0.5% to 50% of the weight of the fiber, depending on the depth of the desired shade of color. The dye dispersed organic solvent was then added to the aqueous dye bath which may or may not yet contain the polyolefin fibrous material to be dyed. The best results were obtained where dyeing occurred at a temperature slightly above the glass transition temperature of the polyolefin. The process was found to yield a fiber color that was level and uniform, light-fast, crockfast and washfast.

The fabrics tested were knitted polypropylene, fibers in skein form, polyethylene nonwoven fabrics and polyethylene fibers in skein form. The liquor ratio (L) was 10–15:1. The dye bath temperature was 212° F. for both polypropylene and polyethylene. The dye concentration was varied from 0.5% (owf) to 10% (owf). The carrier concentration was varied from 1.5% (owf) to 30% (owf). The dye was dissolved in the carrier with the carrier being 1.5 to 3 times the concentration of the dye (owf). The dye/carrier solution was slowly added to the dye bath with agitation. The temperature was raised to the appropriate temperature at a rate of about 5° F./minute. Once the bath temperature was achieved, it was maintained for 30–60 minutes. The bath was lowered to room temperature at a rate of about 5° F./minute. The fabric was then removed from the bath and rinsed.

Tests 1

Fiber: Polypropylene knit
Dyes: 1,4-bis C5, C8, C10, C18 alkylaminoanthraquinone (BLUE), at 4% (owf)
Carrier: Orthochlorotoluene Type at 12% (owf)
Temperature: 210° F.
Time: 30 minutes

| TEST | C5 DYE | C8 DYE | C10 DYE | C18 DYE |
|---|---|---|---|---|
| Wet Crock | 4.5 | 5.0 | 5.0 | 5.0 |
| Dry Crock | 4.5 | 5.0 | 5.0 | 5.0 |
| 2A Wash Test | 5.0 | 5.0 | 5.0 | 5.0 |
| Fadometer | | | | |
| 20 Hr | 4.5 | 4.5 | 5.0 | 5.0 |
| 40 Hr | 4.0 | 4.0–4.5 | 4.5 | 5.0 |
| 60 Hr | 4.0 | 4.0 | 4.5 | 4.5 |

Tests 2

Fiber: Polypropylene knit
Dyes: 1,8-bis C5, C8, C10, C18 alkylaminoanthraquinone (BLUISH-RED), at 4% (owf)
Carrier: Orthochlorotoluene Type at 12% (owf)
Temperature: 210° F.
Time: 30 minutes

| TEST | C5 DYE | C8 DYE | C10 DYE | C18 DYE |
|---|---|---|---|---|
| Wet Crock | 4.5 | 5.0 | 5.0 | 5.0 |
| Dry Crock | 4.5 | 5.0 | 5.0 | 5.0 |
| 2A Wash Test | 5.0 | 5.0 | 5.0 | 5.0 |
| Fadometer | | | | |
| 20 Hr | 4.5 | 4.5 | 5.0 | 5.0 |
| 40 Hr | 4.0 | 4.0–4.5 | 4.5 | 5.0 |
| 60 Hr | 4.0 | 4.0 | 4.5 | 4.5 |

Tests 3

Fiber: Polypropylene knit
Dyes: 2-C5, C8, C10, C18 alkylaminoanthraquinone (GOLDEN-ORANGE) at 4% (owf)
Carrier: Orthochlorotoluene Type at 12% (owf)
Temperature: 210° F.
Time: 30 minutes

| TEST | C5 DYE | C8 DYE | C10 DYE | C18 DYE |
|---|---|---|---|---|
| Wet Crock | 4.5 | 5.0 | 5.0 | 5.0 |
| Dry Crock | 4.5 | 5.0 | 5.0 | 5.0 |
| 2A Wash Test | 5.0 | 5.0 | 5.0 | 5.0 |
| Fadometer | | | | |
| 20 Hr | 4.5 | 4.5 | 5.0 | 5.0 |
| 40 Hr | 4.0 | 4.0–4.5 | 4.5 | 5.0 |
| 60 Hr | 4.0 | 4.0 | 4.5 | 4.5 |

Tests 4

Fiber: Polypropylene knit
Dyes: 1-(C5, C8, C10, C18 alkylamino) 2-chloroanthraquinone (SCARLET), at 4% (owf)
Carrier: Orthochlorotoluene Type at 12% (owf)
Temperature: 210° F.
Time: 30 minutes

| TEST | C5 DYE | C8 DYE | C10 DYE | C18 DYE |
|---|---|---|---|---|
| Wet Crock | 4.5 | 5.0 | 5.0 | 5.0 |
| Dry Crock | 4.5 | 5.0 | 5.0 | 5.0 |
| 2A Wash Test | 5.0 | 5.0 | 5.0 | 5.0 |
| Fadometer | | | | |
| 20 Hr | 4.5 | 4.5 | 5.0 | 5.0 |
| 40 Hr | 4.0 | 4.0–4.5 | 4.5 | 5.0 |
| 60 Hr | 4.0 | 4.0 | 4.5 | 4.5 |

Tests 5

Fiber: Polyethylene non-woven and polyethylene fiber-skein formation
Dyes: 1,4-bis C5, C8, C10, C18 alkylaminoanthraquinone (BLUE), at 4% (owf)
Carrier: Orthochlorotoluene Type at 12% (owf)
Temperature: 210° F.

Time: 30 minutes

| TEST | C5 DYE | C8 DYE | C10 DYE | C18 DYE |
|---|---|---|---|---|
| Wet Crock | 4.5 | 5.0 | 5.0 | unlevel |
| Dry Crock | 4.5 | 5.0 | 5.0 | unlevel |
| 2A Wash Test | 5.0 | 5.0 | 5.0 | unlevel |
| Fadometer | | | | |
| 20 Hr | 4.5 | 4.5 | 5.0 | unlevel |
| 40 Hr | 4.0 | 4.0–4.5 | 4.5 | unlevel |
| 60 Hr | 4.0 | 4.0 | 4.5 | unlevel |

For the polypropylene fabric and fiber, there was no difference in the levelness of the dyeing, regardless of the length of the alkylamino chain on the dye. All the fabric and fiber skeins dyed evenly, devoid of spottiness or blotchiness. All the dyed fabrics and fiber skeins were subjected to wet and dry crock fastness. Each dyed material had a crock rating of 4.5 to 5.0. An AATCC 2A wash test was run on the fabric and fiber in skein form. Each dyed material had a wash fastness rating of 4.5 to 5.0.

For the polyethylene nonwoven fabric and fiber, the C-18 dyes (all isomers) dyed poorly. The fabric and fiber skeins showed unlevel sorption on the substrate surface. The lower alkylamino dyes (C5–10) showed no difference in the levelness of the dyeing, regardless of the length of the alkylamino chain on the dye. All the fabric and fiber skeins dyed evenly, devoid of spottiness or blotchiness. All the dyed fabrics or fiber skeins were subjected to wet and dry crock fastness. Each dyed material had a crock rating of 4.5 to 5.0. AN AATCC 2A wash test was run on the fabric and fiber in skein form. Each dyed material had a wash fastness rating of 4.5 to 5.0.

What is claimed is:

1. A method of dyeing polyolefin fibers wherein the fibers are contacted with a colloidal emulsion at or above the glass transition temperature of the polyolefin, the emulsion having been prepared by mixing water with a long chain alkylaminoanthraquinone dye dissolved in an organic solvent.

2. The method of claim 1 wherein the emulsion is prepared by mixing water with alkylaminoanthraquinone dissolved in an orthochlorotolune solvent.

* * * * *